United States Patent [19]

Freeman

[11] 4,400,108

[45] Aug. 23, 1983

[54] MOBILE REINFORCED CONCRETE PIPE MACHINE

[76] Inventor: Victor L. Freeman, 1325 Partridge La., Oceanside, Calif. 92054

[21] Appl. No.: 334,969

[22] Filed: Dec. 28, 1981

[51] Int. Cl.³ ................. E02D 29/10; E03F 3/06; E04G 21/12
[52] U.S. Cl. .................... 405/155; 425/59; 425/64
[58] Field of Search ............. 405/146, 155, 271, 283; 425/59, 63, 64, 111

[56] References Cited

U.S. PATENT DOCUMENTS

| 517,808 | 4/1894 | Ransome | 405/155 X |
| 2,406,025 | 8/1946 | Moor | 405/155 X |
| 3,049,783 | 8/1962 | Hanson | 425/59 |
| 3,091,013 | 5/1963 | Robinson | 425/59 |
| 3,487,649 | 1/1970 | Bergstrom | 405/146 |
| 3,792,942 | 2/1974 | Cole | 425/59 |
| 4,001,358 | 1/1977 | McNeill et al. | 425/59 X |
| 4,298,296 | 11/1981 | Hanson | 405/155 X |

FOREIGN PATENT DOCUMENTS

| 224413 | 10/1959 | Australia | 405/155 |
| 2421642 | 11/1975 | Fed. Rep. of Germany | 425/64 |

Primary Examiner—James A. Leppink
Assistant Examiner—Nancy J. Pistel
Attorney, Agent, or Firm—Frank D. Gilliam

[57] ABSTRACT

A mobile reinforced pipe machine for producing and laying concrete pipe on site in a ditch or the like. The machine comprises a frame structure capable of supporting the machine for movement along a ditch; hydraulically positionable outrigger wheels carried by the frame for machine guidance along the ditch; a pair of rotating nested sleeves with compactor vibrators therebetween which receive solidifiable cementitious material, such as concrete, vibrate the entering mixture to assure uniformity of mix; longitudinal and circumferential reinforcing wire fed between the sleeves for embedding within the solidifiable cementitious material for reinforcing the solidified pipe leaving the machine; plates or slip forms are attached to the frame adjacent the sleeves for receiving and supporting partially solidified pipe as it exits the machine as the machine moves forward; motor and transmission to transport the machine along the ditch and rotate the sleeves. Earth compactors are provided to force backfill under the newly-formed pipe for support.

14 Claims, 14 Drawing Figures

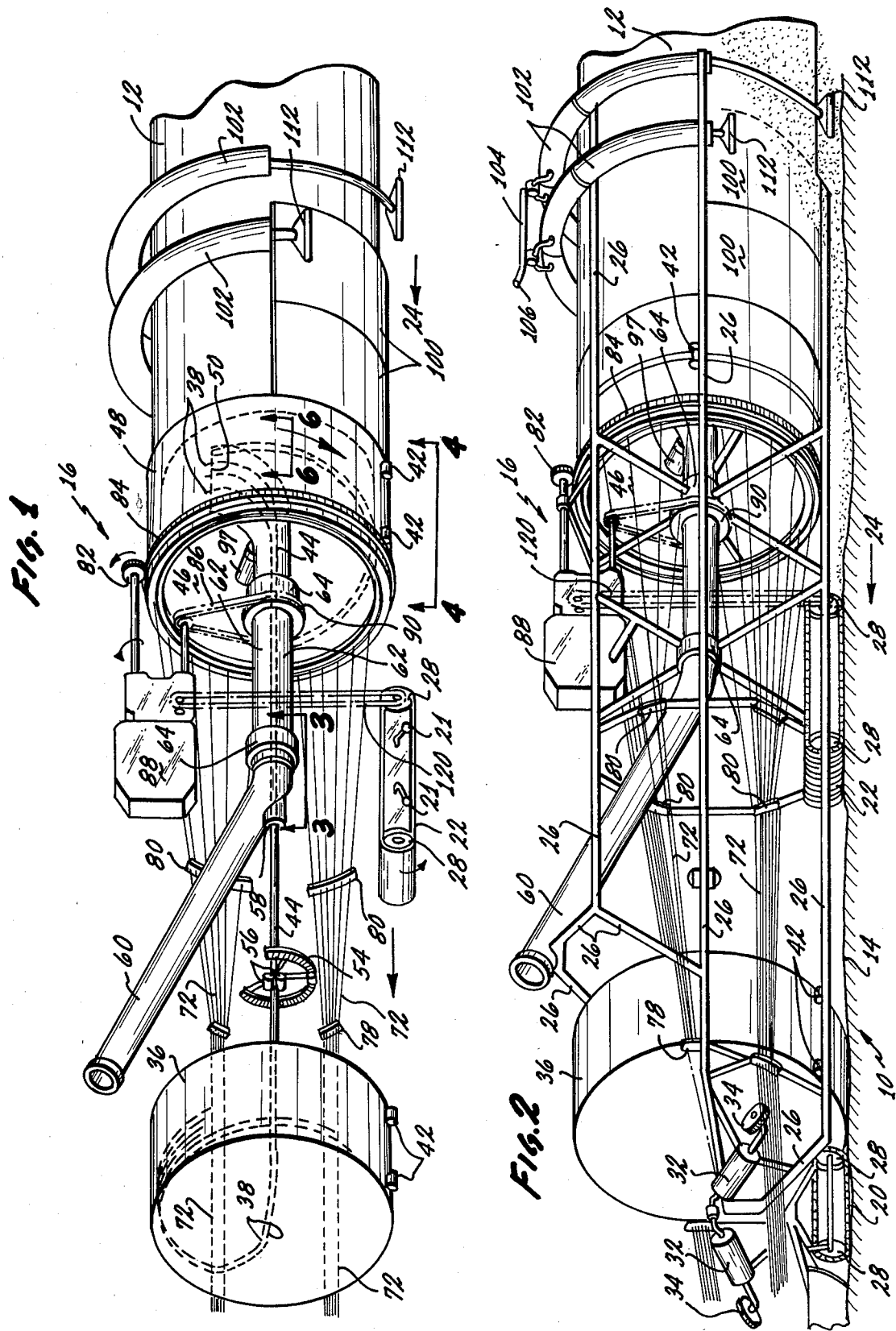

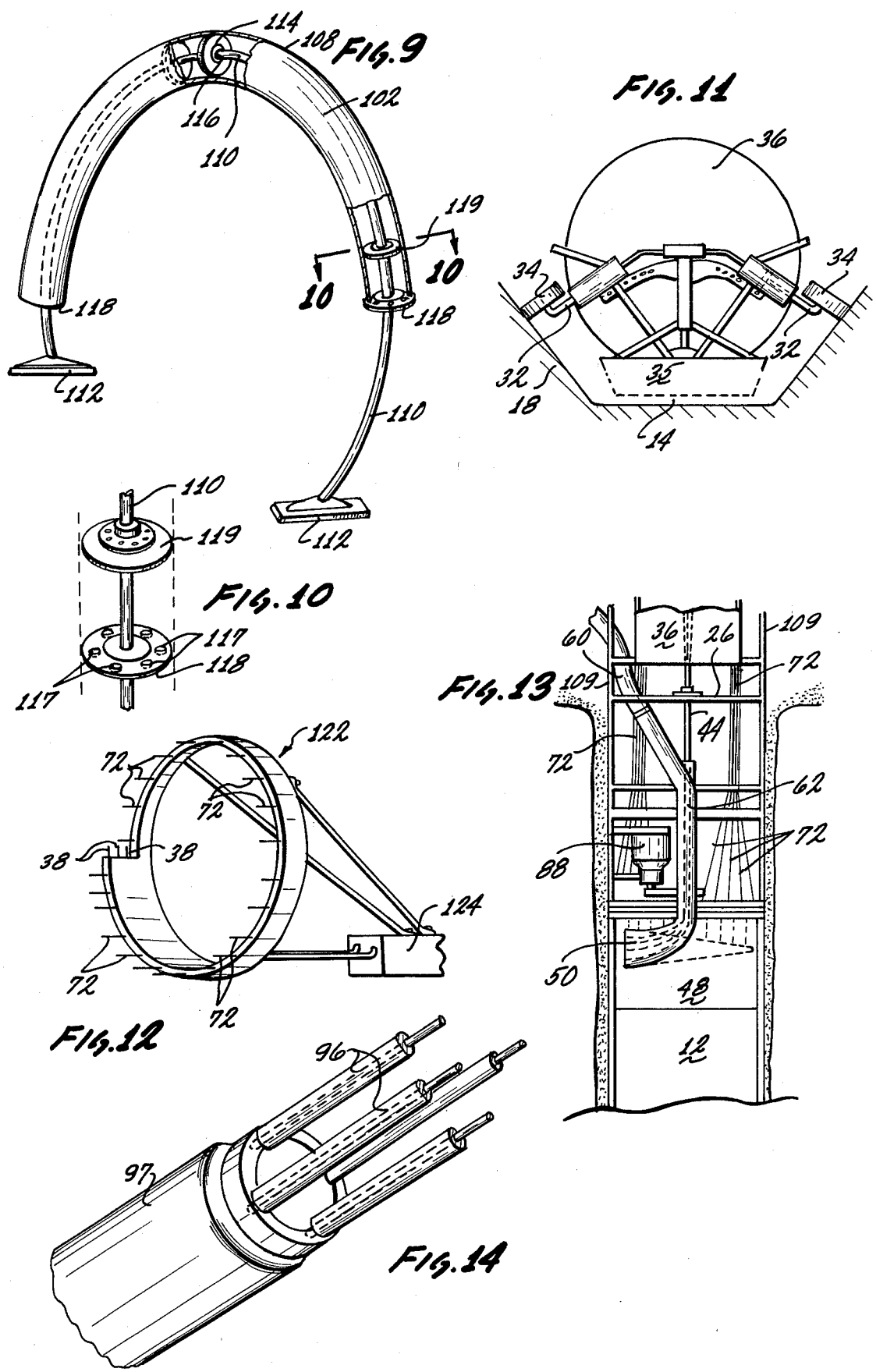

MOBILE REINFORCED CONCRETE PIPE MACHINE

BACKGROUND OF THE INVENTION

1. Field of the Invention

The invention generally relates to the formation of reinforced concrete pipe; and more specifically to an apparatus for forming continuous and seamless concrete pipe on site in a ditch or shaft.

2. Description of the Prior Art

A search of the prior art uncovered various types of pipe-forming machines of a general nature. These devices were described in U.S. Pat. Nos. 2,406,025; 2,734,248; 3,049,783; 3,091,013; 3,193,901; 3,792,942; 3,877,855 and 4,001,358. The machines covered by the references appear to produce various types of useable pipe with some of the pipe produced being reinforced in some manner. The main drawback to all prior art machines is the lack of obtaining good uniform consolidation of the solidifiable cementitious material while being deposited within the moving parts of the machine. This problem does not appear to have been solved prior to the emergence of the instant invention.

SUMMARY OF THE INVENTION

It is an object of this invention to produce pipe formed from solidifiable cementitious material, such as concrete, which has a uniform consolidation of the material from which it is formed.

It is another object of this invention to place within the walls of the pipe both longitudinal and circumferential reinforcing wires.

Still another object of this invention is to provide a compacted surface for the immediate support of the newly-formed pipe.

The machine of the instant invention is supported by a tubular open frame which has forward guide wheel means. These wheels are telescopically adjustable through outrigger support means so that they maintain machine guidance as it traverses along the ditch. Suitable surface supporting and translating means, such as rotatable tread are also carried by the frame for machine movement along the ditch. A pair of nested, separated sleeves are rotatably carried by the frame. The outermost sleeve, the rotatable tread and the inner sleeve are rotated by a common motor means. A solidifiable cementitious material, such as concrete, is supplied to the sleeves by a fixedly positioned supply tube which interconnects to the revolving sleeves through a first rotatable joint and then to a placement head attached to the inner sleeve. A space between the two sleeves is provided to receive the concrete or the like from the placement head supplied through an opening in the inner sleeve. The space between the sleeves extends from the placement head to the rear of the sleeves and forms a spiral path therebetween. Longitudinal reinforcing wires are fed between the sleeves through the concrete wherein they are embedded in the finished pipe. Circumferential reinforcing wires are supplied through the center of the supply tube and placement head to a like area between the sleeves and are likewise embedded into the finished pipe. Adjacent the spiral path between the sleeves a plurality of longitudinally tapered vibrators are positioned for compacting the particulate material and bringing the slurry from the concrete to the surface which aids lubrication of sleeve movement. Curvilinear guide means approximately twice the longitudinal length of the nested sleeves are attached rearly adjacent the sleeves to receive and support the newly-formed pipe as it leaves the sleeves with forward machine movement. Rearward of the circular guide means are compactors which articulate in a manner so as to prepare the ditch bottom surface to receive and support the newly-formed pipe as it leaves the circular guide. When the laying of the pipe is initially commenced, a dead weight form is used to secure the reinforcing wire strands in their relative position prior to introducing the concrete between the sleeves. As the machine moves down the ditch and the concrete cures, the dead weight can be removed and stored for later use.

Further objects and advantages of the instant invention will become apparent as the following description proceeds and the features of the novelty which characterize this invention will be pointed out with particularity in the claims annexed to and forming a part of this specification.

BRIEF DESCRIPTION OF THE DRAWINGS

The present invention may be more readily described by reference to the accompanying drawings in which:

FIG. 1 is a perspective showing of the machine of the instant invention with the supporting frame and the foreground longitudinal reinforcing wires and their supporting means removed for clarity;

FIG. 2 is a perspective showing of the machine of FIG. 1 additionally including frame members and all of the longitudinal reinforcing wires and their supporting means omitted from FIG. 1;

FIG. 9 is a cutaway showing of a compactor of FIGS. 1 and 2;

FIG. 10 is a perspective showing taken along line 10—10 of FIG. 9;

FIG. 11 is a showing of the front of the machine of FIG. 2;

FIG. 12 is a perspective showing of starter ring for initial start-up of the machine of FIGS. 1 and 2; and FIG. 13 is a showing of a modified version of the machine of FIGS. 1 and 2 for use in a vertical mode.

FIG. 14 is a showing of the motor for rotating a plurality of vibrators.

DETAILED DESCRIPTION OF PREFERRED EMBODIMENT

Figure 3:
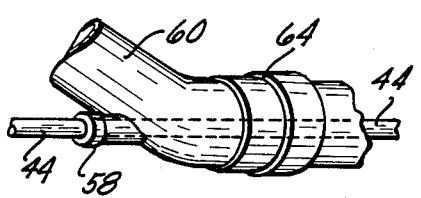
FIG. 3 is a showing taken along line 3—3 of FIG. 1.

Referring now to FIGS. 1 and 2, of the drawings, a ditch 10 which has been previously formed or dug in the ground and which it is desired to form the conduit 12. Ditch 10 has a bottom surface 14 which supports the machine 16 and conduit fabricated thereby and side walls 18 (see FIG. 11) which guide the machine 16 along the ditch. The machine 16 is supported on and driven by forward and rearward tread assemblies 22.

The machine is moved along ditch 10 by means of treads 20, 22 in the direction of arrow 24.

The machine 16 has a frame 26 constructed of steel bar material or the like of sufficient strength and size to support at least a portion of the weight of the machine as well as the conduit being fabricated. The various frame members are preferably attached together by conventional welding means. The front of the machine carries a forward guidance assembly which includes the aforementioned tread assembly 20 and a pair of outrigger side wall contact guidance members 34. The tread assembly includes driver wheels 28 and track tread 20. Tension members maintain sufficient pressure to the treads to maintain tautness and tread flexibility. Tension members for this purpose are well known in the art. It should be understood that various other different means of propelling the machine along the ditch could be used with equal success.

Referring now also to FIG. 11, the outrigger assembly includes a pair of frame mounted linear actuators 32. These actuators 32 may be of any convenient type, such as but not limited to hydraulic, pneumatic, mechanical screw jack or the like. Pneumatic type shown which includes pistons. Rotatably attached to each actuator's translating member is a wall contacting wheel 34. In operation the actuators 32 are extended until the wheels 34 contact the ditch side walls 18 and as the machine moves along arrow 24 the wheels roll along the ditch maintaining upright and longitudinal support of the machine. Forward of the tread 20 and wheels 34 is a scraper blade 35 which prepares the surface of the ditch bottom surface 14 for the machine 16 to move on.

Figure 4:
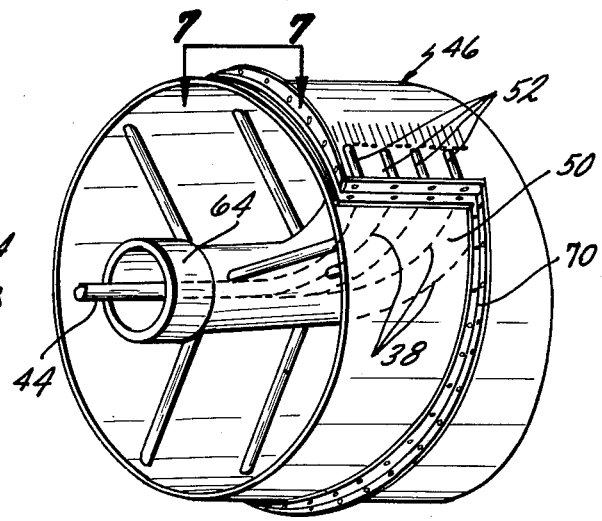
FIG. 4 is a showing of the inner sleeve of the forming drum with the placement head in position, the placement head is shown partially in phantom.

A wire reel 36 carries a supply of reinforcement wire 38 which provides circumferential reinforcement to the finished conduit 12. The wire has been wound on the reel in a number of separate strands 38 (see FIG. 4) equal in number to the number required for reinforcement. Four are shown for convenience of discussion; however, any convenient number more than or less than four may be required or desired to practice this invention. The reel 36 is supported on frame members 26 by way of rollers 42. Various other means for rotating wire reel 36 with respect to frame members 26 may be used equally as well to practice this invention.

The circumferential reinforcing wire exiting the wire reel 36 enters wire guide tube 44 where it is delivered between the conduit forming sleeves 46,48 by the material placement head 50 through individual strand tubes 52. The number of strand tubes equal the number of individual wire strands 38 (four shown). The wire tube 44 is supported through a ring 54 which is attached to the tube and rotates therewith relative to the frame members 26. This attachment can be done by any convenient means not shown. A pair of rollers 56 carried by ring support 54 guide the wire strands from drum 36 into tube 44.

The circumferential wire guide tube 44 is supported by bearing 58 (also see FIG. 3). The bearing 58 is held captive by fixed material delivery tube 60. Fixed material delivery tube 60 extends upward from wire guide tube 44 and is fixedly secured to frame members 26.

The fixed material delivery tube 60 is interconnected to a rotatable material delivery tube 62 through a bearing slip joint 64 carved by the frame members 26 which allows sealed relative movement between the fixed and rotatable material delivery tubes 60,62 respectively. The material placement head 50 is attached to the rotatable material delivery tube 62 as an extension thereof. It should now be clear that the separate circumferential reinforcing wires are drawn from reel 36, pass through wire guide tube 44 and out the strand tubes 52.

Figure 6:
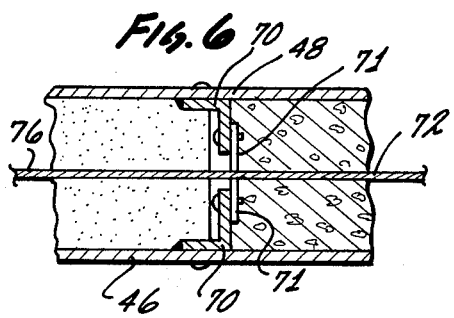
FIG. 6 is a partial cross-sectional showing of the drum with the inner and outer sleeves in their nested position.
Figure 5:
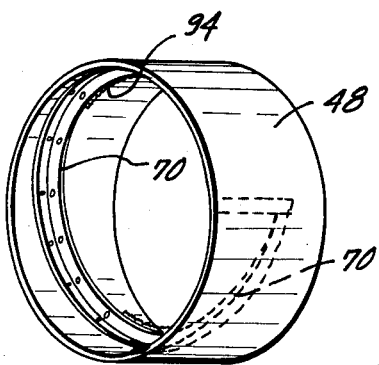
FIG. 5 is a showing of the outer sleeve of the forming drum shown partially in phantom.

The outer end of the material placement head 50 is attached to inner sleeve 46. It should be noted that the material placement head 50 changes cross-sections configuration between the rotating material delivery tube and the strand tube end and yet maintains relatively the same cross-sectional area. The space formed by the adjacent internal surfaces of both sleeves 46 and 48 form a complete spiral end to end longitudinally. The edge surfaces defining the spiral are formed by retainers 70 on both sleeve 46 and 48 which carry a firm but flexible edge member 71 (see FIGS. 5 and 7). These retainers 70 are sufficiently separated from each other so as to ride over longitudinal reinforcement wires 72 (see FIG. 6).

The longitudinal reinforcement wires 72 are provided from external reels (not shown) positioned forward of the machine 16. These wires 72 are guided through wire combs 78 and 80 carried by the frame members 26 and, finally, through tensioners 81 which place the wires 72 under a slight tension. The total number of wires shown is twenty-four. It should be understood that more than or less than twenty-four could be utilized to practice this invention. The number is determined by conduit diameter and conduit wall strength desired. The wire diameter likewise is determined in the same manner. The wires 76 are fed from the source ahead of the machine through combs 78,80,81 between sleeves 46,48 (see FIG. 6) and are embedded into conduit 12.

The sleeves 46 and 48 rotate about frame members 26 and conduit 12 on rollers 42. It should be understood that wire reel 36, circumferential guide tube 44, rotatable material delivery tube 62, material placement head 50 and sleeves 46,48 rotate relative to frame members 26 by a combination of gears 82,84 and belt drive 86 driven by motor 88 driving the outer sleeve 48 and drive flange 90 attached to the rotatable delivery tube. The inner sleeve 46 is rotated with the outer sleeve through the material placement attachment and concrete material confined within the spiral sections between the sleeves 46,48.

Figure 7:
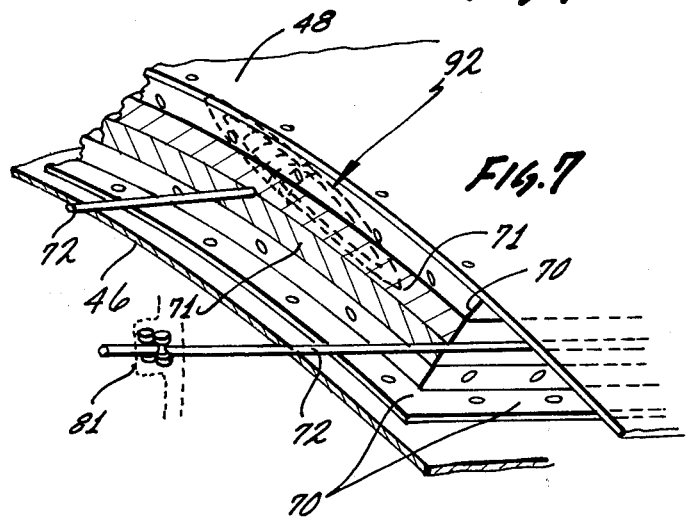
FIG. 7 is a showing taken along line 7—7 of FIG. 4 and additionally including a vibrator assembly.
Figure 8:
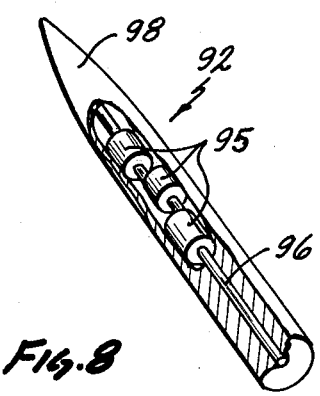
FIG. 8 is a cutaway showing of the vibrator of FIG. 7.

Referring now to FIGS. 7, 8 and 14, a plurality of vibrators 92, generally four or more, are positioned adjacent the inner spiral wall 94. The vibrators are conventional off-center weights 95 that cause vibration when rotated about the center line by rotation of a central shaft 96 by motor means 97 which has a plurality of output shafts 96. The power to the vibrator drive motor, like circumferential reinforcing wire 38, is fed through the material placement head 50 from a convenient power source, an example being slip rings (not shown). The trailing edge 98 of the vibrators 92 are designed in the form of a taper to allow uncured concrete material or the like used in the conduit 12 construction to flow into place more rapidly than the conventional blunt or round end vibrators commonly known in this art. The vibrators 92 bring a slurry from the concrete mix to the surface and help to lubricate the movement of the sleeves 46,48 relative to longitudinal reinforcing wire 72 and to eliminate any grooving in the finished conduit 12 caused by the strand tubes 52.

Fixedly positioned rearward of the sleeves 46,48 is a curvilinear slip form 100. The slip form 100 is shown to be approximately double the length of the sleeves 46,48 (the slip form 100 is shown in two sections). Various other length of slips form 100 may be used to practice this invention, the principle criteria is the forward speed of the machine, type of solidifiable cementitious material, curing time, etc. This slip form provides immediate support to the newly-formed conduit as it leaves the sleeves.

A pair of earth compactors 102 are connected to the frame members 26. One of the compactors 102 is positioned over a rear portion of the slip form 100 and the other is position spaced from the trailing edge of the slip form. A pneumatic line 104 interconnect the compactors at approximately upper center. The outer end 106 of the pneumatic line 104 is connected to a source of air under pressure not shown. Referring now specifically to FIGS. 9 and 10, each compactor 102 includes a cylinder 108 formed in a semi-circle. A connected rod 110 of like curvature is positioned within the cylinder 108 and extends through each end thereof. A compactor foot 112 is attached to each end of rod 110. A central diaphram 114 is attached to the inner walls of the cylinder 108 and the rod moves through the center 116 relative thereto. Positioned on each end of the cylinder 108 is a stationary diaphram 118 with air ports or openings 117. Attached to the rod for sealed movement within the cylinder on each side of the rod intermediate the compact foot 112 and the central diaphram 114 are diaphram 119 creating a dual action piston as air pressure is switched from one side of the central diaphram 114 to the other side thereof after the maximum extension of rod 110's movement is reached in a given direction. The diaphrams are constructed of any suitable flexible material such as, for example, plastic, rubber or the like. The purpose of the compactors is to press moist sand or earth supplied adjacent thereto underneath the newly-formed conduit.

The machine 16 is propelled along the ditch 10 by driven tracks 22 driven by means of chain or belt 120 interconnected to a power takeoff from motor 88.

Referring now to FIG. 13, the machine 16, shown schematic form, is shown operating in a vertical shaft rather than a ditch as hereinbefore discussed. The machine 16 is substantially the same as the ditch conduit machine except the vertical shaft machine includes an outer skin 109 surrounding the machine framework. This skin 109 keeps backfill from getting into the machine's moving parts.

OPERATION OF THE MACHINE

To begin fabrication of conduit 12, a pre-starter ring 122 is used. The ring 122 comprises a pre-cast section of conduit 12 formed with a spiral leading edge which corresponds to and mates with the spiral material retainers 70 attached to sleeves 46,48. Prior to fabrication, the starter ring 122 is set up in the ditch and is securely fastened to a dead man 124 or a similar stationary object. The machine 16 is then placed in position. The longitudinal reinforcing wires 72 and the circumferential reinforcing wire 38 are attached to the ring 122 either by passing through anchor apertures through the ring or are attached to corresponding wires extending from the ring by welding or the like.

Solidifiable cementitious material, such as uncured concrete, is then pumped into the material delivery tube and supplied to the open end of the material placement head 50. Allowing ample time for the uncured material to abut the adjacent end of ring 122, the motor 88 is then energized. As the machine is propelled along the trench reinforcing wires 72, 38 are embedded in the uncured material. As the material cures and exits the machine in the newly-formed conduit, it first rests on slip form 100 and as the newly-formed conduit nears the outer edge of the slip form, the compactors compact moist dirt or sand supplied by external means under the conduit.

Approximately eighty to ninety feet of conduit can be produced per hour with the volume of solidifiable cementitious delivered being approximately four and a half cubic yards for a thirty-six inch diameter conduit with an approximate three inch wall.

The diameter of the steel reinforcing wires 38,72 and the exact ratio of particulate material to aggregate and slump of the solidifiable cementitious material is determined by speed of the machine, strength requirsments of the finished conduit and the number of strands of reinforcing wire.

While the description is directed to a preferred embodiment, it will be understood that various modifications in the specific structure of the apparatus for practicing the invention may be made so long as the essential features thereof are retained. It is believed that those skilled in the art will make modifications of and additions to the preferred embodiment of the apparatus described herein without departing from the essential features thereof required to practice this invention.

What is claimed is:

1. An on site pipe forming and laying machine comprising:
    a frame member movable along a pre-formed ditch;
    a guide means contacting the side walls of said ditch carried by said frame member for lateral support and guiding of said machine along said ditch;
    a pair of nested rotatable sleeves disposed on said frame;
    supply means for supplying uncured solidifiable cementitious material between said sleeves at a selected location;
    reinforcing wire supply means for supplying longitudinal and circumferential reinforcing wire within said solidifiable cementitious material;
    slip form means carried by said frame, rearward of said sleeves and substantially centered along the bottom of said ditch; and
    means for moving said machine along said ditch and rotating said sleeves,
    whereby wire reinforced concrete pipe is formed between said sleeves and as said machine moves along said ditch newly-formed pipe exits said sleeves and is temporarily supported by said slip form means while initially curing.

2. The invention as defined in claim 1 wherein said frame member is constructed of material suitable for supporting the weight of said machine and said uncured concrete.

3. The invention as defined in claim 1 wherein said guide means comprises;
    a scraper for preparing the bottom surface of said ditch for machine movement;
    a pair of separately selectively translatable linear actuators; and
    a pair of wheels, one attached to the distal end of the translatable portion of each linear actuator,
    whereby said translatable linear actuators are translated so that each wheel rides along its adjacent ditch wall for maintaining said machine in its operable position as it moves along said ditch.

4. The invention as defined in claim 3 wherein said linear actuators are pneumatically operated.

5. The invention as defined in claim 1 wherein said sleeves have a spiral opening therebetween with a leading and trailing outer edge and said solidifiable cementitious material is deposited therebetween said circumferential reinforcing wire is introduced at the leading edge thereof and both said solidifiable cementitious material and circumferential reinforcing wire exit the trailing edge thereof.

6. The invention as defined in claim 5 wherein a space is provided between said sleeves to allow the longitudinal reinforcing wires to pass therebetween as the machine moves along said ditch.

7. The invention as defined in claim 1 wherein said solidifiable cementitious material supply means comprises;
   a conduit leading from a source of solidifiable cementitious material;
   a rotatable tube attached to said conduit through a sealed slip joint; and
   a placement head attached to said rotatable tube and rotatable therewith.

8. The invention as defined in claim 7 wherein the cross-sectional configuration of said rotatable tube and placement head are different and their cross-sectional areas are substantially equal.

9. The invention as defined in claim 1 wherein the supply means for said longitudinal reinforcing wire is forward of said machine and is spacedly guided between said sleeves.

10. The invention as defined in claim 1 wherein the means for supplying said circumferential reinforcing wire comprises a drum which rotates with said sleeves wherein the wire, in plural spaced-apart strands, is fed into a spiral opening between said sleeves through said solidifiable cementitious material supply means.

11. The invention as defined in claim 7 wherein said means for moving said machine along said ditch and rotating said sleeves comprises a motor-driven transmission interconnected to said sleeves and rotatable traction means positioned between said machine and its supporting surface.

12. The invention as defined in claim 1 additionally comprising a plurality of spaced apart vibrator means positioned between said sleeves adjacent to said selected location of said solidifiable cementitious material for compacting said material and lubricating sleeve movement with respect to said uncured concrete.

13. The invention as defined in claim 1 additionally comprising compactor means for compacting the bottom of said ditch to provide immediate support for said pipe as it exits said machine.

14. The invention as defined in claim 1 additionally comprising a housing around said machine for operation within a vertical bore to prevent foreign matter from contact with the working mechanism of said machine.

* * * * *